United States Patent [19]

Garzelloni

[11] Patent Number: 5,016,748
[45] Date of Patent: May 21, 1991

[54] ACCUMULATING CONVEYOR

[75] Inventor: Thomas L. Garzelloni, Worth, Ill.

[73] Assignee: Automotion, Incorporated, Worth, Ill.

[21] Appl. No.: 377,563

[22] Filed: Jul. 10, 1989

[51] Int. Cl.⁵ .............................................. B65G 13/06
[52] U.S. Cl. ...................................... 198/781; 198/790
[58] Field of Search ........................ 198/781, 789, 790

[56] References Cited

U.S. PATENT DOCUMENTS

| | | | |
|---|---|---|---|
| 4,103,769 | 8/1978 | Jorgensen | 198/789 X |
| 4,109,783 | 8/1978 | Vogt | 198/789 X |
| 4,174,777 | 11/1979 | Riehle | 198/790 X |
| 4,215,775 | 8/1980 | Gebhardt | 198/781 |
| 4,223,780 | 9/1980 | Saur | 198/781 |
| 4,291,796 | 9/1981 | Gebhardt | 198/781 X |
| 4,301,914 | 11/1981 | Krammer | 198/781 |
| 4,362,238 | 12/1982 | Rivette | 198/781 |
| 4,453,627 | 6/1984 | Wilkins | 198/781 |
| 4,488,638 | 12/1984 | Morgan et al. | 198/781 |
| 4,572,353 | 2/1986 | Felder | 198/781 X |
| 4,588,073 | 5/1986 | Abell | 198/790 X |
| 4,605,120 | 8/1986 | Vanderlinde et al. | 198/781 |
| 4,817,784 | 4/1989 | Judge | 198/810 X |
| 4,854,445 | 8/1989 | Eaton et al. | 198/781 |

FOREIGN PATENT DOCUMENTS 57-67404  4/1982  Japan ................... 198/790

Primary Examiner—Joseph E. Valenza
Assistant Examiner—Cheryl L. Gastineau
Attorney, Agent, or Firm—Wood,Phillips,Mason, Recktenwald & Vansanten

[57] ABSTRACT

An accumulating conveyor includes a frame having generally parallel sides with a plurality of load-carrying rollers rotatably mounted between the frame sides. A plurality of lifting rollers are rotatably mounted between the frame sides beneath the load-carrying rollers. A drive belt extends between the load-carrying rollers and the lifting rollers for rotating the load-carrying rollers in response to the lifting rollers lifting the belt into engagement with the load-carrying rollers. A plurality of sensing roller assemblies are mounted on selected, spaced load-carrying rollers. The sensing roller assemblies each include a carriage pivotally mounted on the axis of a load-carrying roller, a sensing roller mounted on the carriage on one side of the axis and a counterbalance roller heavier than the sensing roller mounted on the opposite side of the axis. The counterbalance roller is effective to bias the sensing roller into the path of movement of articles moving along the conveyor. The sensing roller assembly is operatively associated with actuator means for deactivating the drive to load-carrying rollers upstream of the sensing roller assembly when an article depresses the sensing roller.

17 Claims, 2 Drawing Sheets

ACCUMULATING CONVEYOR

FIELD OF THE INVENTION

This invention generally relates to article conveyors and, particularly, to accumulating conveyors.

BACKGROUND OF THE INVENTION

Live roller conveyors, having a frame and a plurality of transverse, belt-driven rollers, are well known in the art. It often is desirable to provide one or more sections of such a conveyor that are capable of accumulating articles being conveyed when a stoppage of article movement occurs downstream on the line. Such a stoppage might occur, for example, when the flow of articles is irregular, and a downstream portion of the handling process is unable to keep up with an increased flow. Irregular flow may occur when conveyor lines crisscross, or a conveyor system may include a sorting area. It may be desirable to stop or slow down a conveyor for hand loading or packaging, or for checking labels, which sometimes is called "singulating out".

While articles can be stopped by simply blocking them on a conventional live-roller conveyor, as more and more articles build up, increased pressure is produced on the downstream articles. Such pressure can produce crushing of the articles, can throw articles off the conveyor, and a large buildup produces extremely high horsepower demands. Damage to articles by pressure buildup is a considerable and sometimes expensive problem. For instance, a very delicate article may be moving along the conveyor between a pair of very heavy articles. Unless the articles are stopped or "accumulated" on the conveyor, the delicate and sometimes expensive articles are damaged by crushing between the larger and heavier articles. Such a problem is not solved by many accumulating conveyors presently available.

For instance, an accumulating conveyor system might include a plurality of load-carrying rollers rotatably mounted between generally parallel frame sides. A plurality of lifting rollers are rotatably mounted between the frame sides beneath the load-carrying rollers. A drive belt extends between the load-carrying rollers and the lifting rollers for rotating the load-carrying rollers in response to the lifting rollers lifting the belt into engagement with the load-carrying rollers. A plurality of sensing rollers are disposed between selected pairs of load-carrying rollers, the sensing rollers being mounted for vertically reciprocating motion to actuate an actuator means which is effective to lift upstream lifting rollers. However, heretofore, the sensing rollers simply were, in one form or another, load-carrying rollers mounted for vertically reciprocating motion. The load-carrying rollers are rather heavy in order to support an appropriate load. When a delicate, lightweight article moves along the conveyor, the article often-times is too light to depress the load-carrying sensing roller. Consequently, the lightweight article becomes crushed between heavier articles notwithstanding the fact that the conveyor was designed for accumulating purposes.

This invention is directed to solving these problems by providing an improved accumulating conveyor which is sensitive to all articles, including very lightweight articles.

SUMMARY OF THE INVENTION

An object, therefore, of the invention is to provide a new and improved accumulating conveyor of the character described.

In the exemplary embodiment of the invention, the accumulating conveyor has frame means including generally parallel sides. A plurality of load-carrying rollers are rotatably mounted between the frame sides. A plurality of lifting rollers are rotatably mounted between the frame sides beneath the load-carrying rollers. A drive belt extends between the load-carrying rollers and the lifting rollers for rotating the load-carrying rollers in response to the lifting rollers lifting the belt into engagement with the load-carrying rollers.

The invention contemplates a plurality of lightweight non-load-carrying sensing rollers disposed between selected pairs of load-carrying rollers. The load-carrying rollers are transversely spaced a distance less than their respective diameters, and the sensing rollers have diameters less than that distance. The sensing rollers are mounted on carriages spanning and pivotally mounted on the ends of a load-carrying roller. The sensing rollers are mounted on the carriage on one diametral side of a given load-carrying roller and a counterbalance roller is mounted on the carriage on the opposite diametral side of the given load-carrying roller. The counterbalance roller is effective to bias the sensing roller upwardly into the path of movement of articles moving along the conveyor, i.e. above a plane defined by the tops of the load-carrying rollers. Therefore, it can be seen that the sensitivity of the system is determined by the differential in weight between the sensing roller and the counterbalance roller, which differential can be extremely small to accommodate or sense very lightweight articles.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
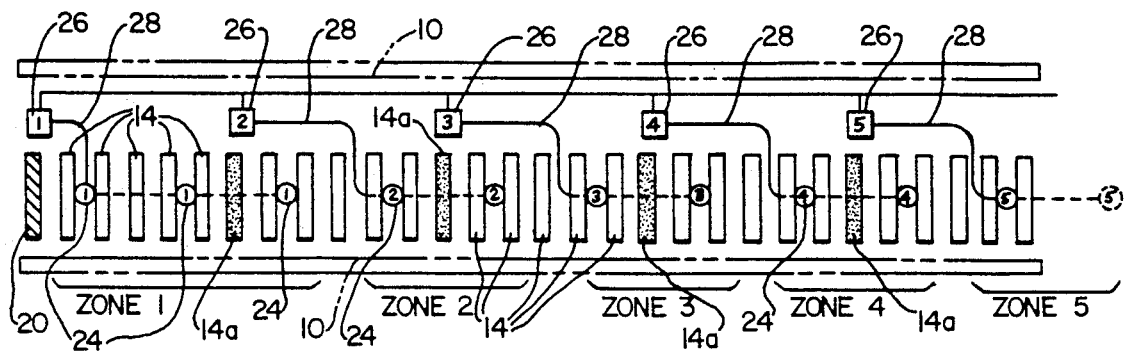
FIG. 1 is a schematic illustration of an accumulating conveyor system incorporating sensing rollers, as has been heretofore known.
Figure 2:
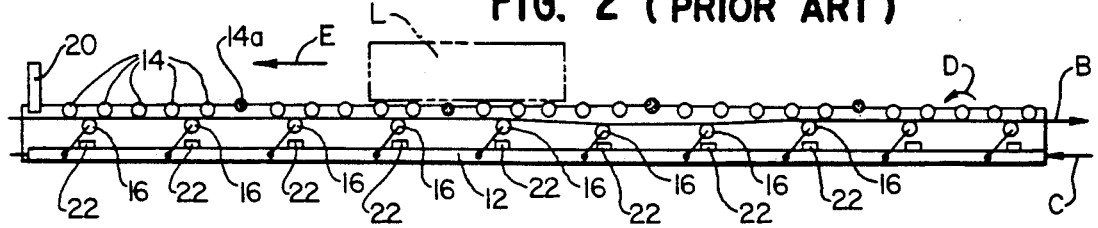
FIG. 2 is a schematic illustration looking at one side of the accumulating conveyor system of FIG. 1.

Referring to the drawings in greater detail, and first to FIGS. 1 and 2, an accumulating conveyor system as is known in the art is shown for illustrative purposes and to describe the general concept of an accumulating conveyor which utilizes belt driven rollers and sensing rollers.

More particularly, the accumulating conveyor system illustrated in FIGS. 1 and 2 shows, in phantom, sides 10 (FIG. 1) of a conveyor frame, and a frame bottom 12 (FIG. 2). Although shown schematically, the conveyor is of the live roller type including a plurality of transverse, belt-driven rollers 14 and 14A spaced along the length of the conveyor in groupings such that there are five rollers 14, then one roller 14A, five rollers 14, one roller 14A, etc., along the length of the conveyor. All of the rollers 14,14A are load-carrying rollers of substantial mass to support a substantial load. However, the intermittently spaced rollers 14A are sensing rollers appropriately mounted between frame sides 10 for vertical reciprocation.

As seen best in FIG. 2, a plurality of lifting rollers 16 are mounted between frame sides 12 beneath load-carrying rollers 14,14A. These lifting rollers are spaced so as to have three load-carrying rollers therebetween lengthwise of the conveyor. A drive belt 18 extends between load-carrying rollers 14,14A and lifting rollers 16 for rotating the load-carrying rollers in response to the lifting rollers lifting the belt into engagement with the load-carrying rollers. As seen at the right end of FIG. 2, the belt is continuous and the upper run thereof moves lengthwise of the conveyor in the direction of arrow "B" and the lower run returns in the direction of arrow "C". When lifted, the belt rotates load-carrying rollers 14,14A in the direction of arrow "D" to cause a load, shown in phantom at "L", to move downstream along the conveyor in the direction of arrow "E". A stop device 20 is shown at the left-hand end of the conveyor and is used to stop a given article for such purposes as sorting, label checking, packaging, loading or the like.

Each lifting roller 16 is associated with an air "bladder" type lifting device 22 which is actuated to lift its respective lifting roller into engagement with belt 18 to move the belt into engagement with the load-carrying rollers. It can be seen in FIG. 1 that the conveyor is divided into zones which are numbered "1" through "5" in an upstream direction. The lifting rollers and their respective lifting bladders are schematically illustrated by circles 24 in FIG. 1 with the numerals "1"–"5" corresponding to the respective zones. An air valve for the lifting bladders/lifting rollers in each respective zone is shown schematically by squares 26 which are indicated by numerals "1"–"5". It can be seen that each air valve 26 is connected by an air line 28 to the bladders in an immediately upstream zone. Although not shown in the schematic illustrations because such connections are known in the art, and to avoid unnecessarily cluttering the illustrations, air valve "1" is operatively associated with stop device 20, air valve "2" is operatively associated with sensing roller 14A in zone "1", air valve "3" is operatively associated with sensing roller 14A in zone "2", and so on upstream of the conveyor whereby each air valve and its respective sensing roller is effective to operate the lifting bladders and the lifting rollers in the immediately adjacent zone in a conveyor upstream direction. In addition, it should be understood that with a sensing roller 14A in an upwardly biased condition, such as the left-hand sensing roller 14A in FIG. 2, the lifting bladders and lifting rollers in the immediately upstream zone are actuated to raise the belt into engagement with the load-carrying rollers in that zone. When load "L" (FIG. 2) comes into engagement with the lefthand sensing roller 14A in FIG. 2, the sensing roller will be depressed, de-energizing the air bladders in zone "2" and thereby lowering the belt to deactivate the load-carrying rollers thereabove.

With the general understanding of this particular type of accumulating conveyor system as described in relation to FIGS. 1 and 2, when the conveyor is in a continuous transportation mode, and the conveyor is empty with no articles thereon, all of sensing rollers 14A are in their raised positions which activate their associate air valves 26 to fill bladders 22 which, in turn, lift lifting rollers 16 and bias belt 18 into engagement with the underside of load-carrying rollers 14. In other words, with each lifting roller raised, the drive belt now is in contact with all carrying rollers and imparts drive to each roller.

When articles are introduced to the in-feed end of the conveyor, i.e. the right-hand end as viewed in the drawings, the articles will be transported down the conveyor as the result of direct drive imparted to all load-carrying rollers 14. When an item approaches and depresses a sensing roller 14A, its associated air valve 26 is activated to release the air in its controlled lifting roller bladders 22. This deactivates the bladders for the zone immediately upstream of any given article so that the article cannot move downstream and apply pressure to the preceding article until that article has moved off of the particular sensing roller or rollers.

For instance, as shown in FIGS. 1 and 2, sensing roller 14A for air valve "3" is shown in FIG. 2 depressed by load "L". As a result, lifting rollers 16 in the immediately adjacent upstream zone "3" are lowered, dropping the drive belt from underside of the load-carrying rollers in that zone. As load "L" leaves sensing roller 14A associated with air valve "3", the valve is activated to allow bladders in zone "3" to be inflated and, therefore, raise the drive belt into contact with the respective load-carrying rollers. This action continues as each sensing roller is activated or depressed. The result is article movement in a singulated mode along the length of the conveyor.

In an accumulation mode, as articles are transported down the conveyor, stop device 20 may be activated to impede forward movement of the articles. With the stop device activated, zone "1" air bladders are lowered thereby lowering drive belt 18 from engagement with the underside of load-carrying rollers in zone "1". Articles being conveyed will come up to and stop behind stop device 20. With sensing roller 14A associated with air valve "2", the valve will release air in lifting bladders 22 in upstream zone "2". The drive belt will be lowered to remove the drive force from zone "2" load-carrying rollers. The load in zone "2" will depress sensing roller 14A associated with air valve "3" which will release the air in lifting bladders 22 for the next upstream zone "3". Again, the drive belt will be lowered and remove the drive force from the load-carrying rollers in zone "3". This same procedure occurs seriatum upstream of the conveyor as articles continue to move down the conveyor toward the stop articles. If all sensing rollers are depressed and all lifting bladders 22 are lowered, the drive belt does not contact any load-carrying rollers, thereby eliminating all line pressure.

In order to reinitiate the transportation mode, i.e. with articles accumulated behind stop device 20, the stop device is removed and air valve 26 activates lifting bladders 22 in zone "1", raising lifting rollers 16 in that zone to raise the drive belt into contact with zone "1" load-carrying rollers 14. With the load-carrying rollers in zone "1" driven, the first article is conveyed forward along the conveyor and sensing roller 14A associated with air valve "2" raises to allow air bladders 22 in zone "2" to raise the drive belt into contact with the load-carrying rollers in zone "2". The articles in that zone are conveyed downstream, and this procedure continues as all sensing rollers are periodically raised between the articles and the conveyor now is back in its transportation mode.

The general accumulating conveyor system of FIGS. 1 and 2 has been described in considerable detail because it is the type of system with which the invention is applicable. However, from the above description, the problem of accumulating articles which include articles of varying weight, particularly very lightweight articles, can be understood. In particular, it can be seen that prior accumulating conveyors of the character described employ spaced ones of the load-carrying rollers 14A as the sensing rollers. These sensing rollers are of substantial mass in order to support substantial loads. However, if a very lightweight article is conveyed across such sensing rollers, the articles have insufficient weight to depress the sensing rollers. Consequently, a delicate, lightweight article may become sandwiched between a pair of heavy articles which can crush the delicate article because it did not depress the particular sensing roller in a particular zone. Consequently, no signal was given to the immediately upstream zone to stop the upstream article.

Figure 3:
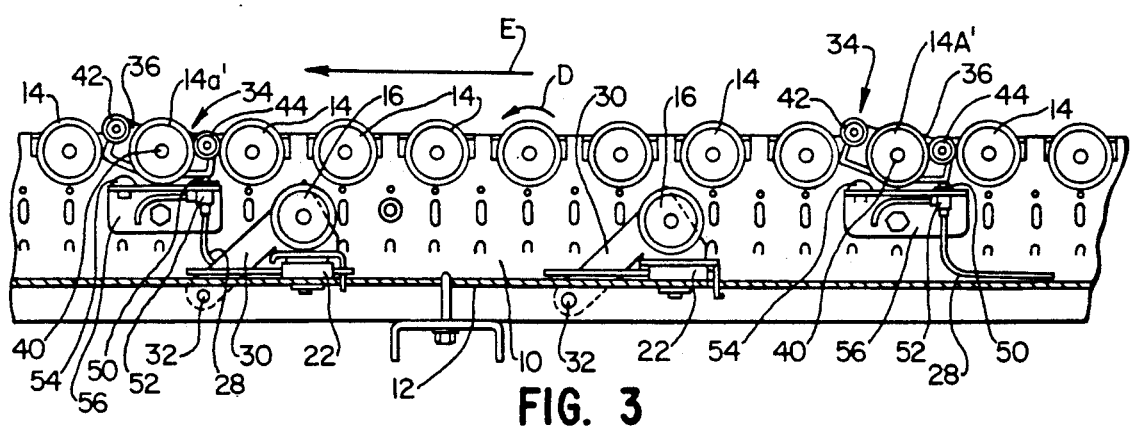
FIG. 3 is a fragmented side elevational view, on an enlarged scale, of an accumulating conveyor incorporating the concepts of the invention.

The invention is shown somewhat schematically in FIG. 3 wherein like numerals have been applied to like components as described in relation to FIGS. 1 and 2. It can be seen that load-carrying rollers 14 are rotatably mounted between frame sides 10 above a frame bottom 12. Lifting rollers 16 are shown mounted between frame sides 10 beneath load-carrying rollers 14. Lifting bladders 22 are shown respectively beneath the lifting rollers. The drive belt (FIG. 2) is not shown in FIG. 3 but would be similarly incorporated. It can be seen that lifting rollers 16 are mounted on lever arms 30 pivotally connected to the frame, as at 32, whereby bladders 22 are effective to pivot lifting rollers 16 upwardly into engagement with the bottom of the drive belt to drive the drive belt into engagement with load-carrying rollers 14 to rotate the rollers in the direction of arrow "D" which, in turn, moves articles down the conveyor in the direction of arrow "E". Lastly, it can be seen that there are four load-carrying rollers 14 between each pair of lifting rollers 16, versus the closer spacing of FIGS. 1 and 2. This simply is to show that such systems vary in spacing and the like, depending upon design parameters.

The invention contemplates a plurality of sensing roller assemblies, generally designated 34, spaced longitudinally of the conveyor. Each sensing roller assembly is mounted on a load-carrying roller which, for consistency purposes, is identified as 14A' simply to show the correlation with sensing rollers 14A in the operation of the prior system of FIGS. 1 and 2. However, it must be understood that load-carrying rollers 14A' are not themselves sensing rollers but are load-carrying rollers just as are rollers 14.

Figure 4:
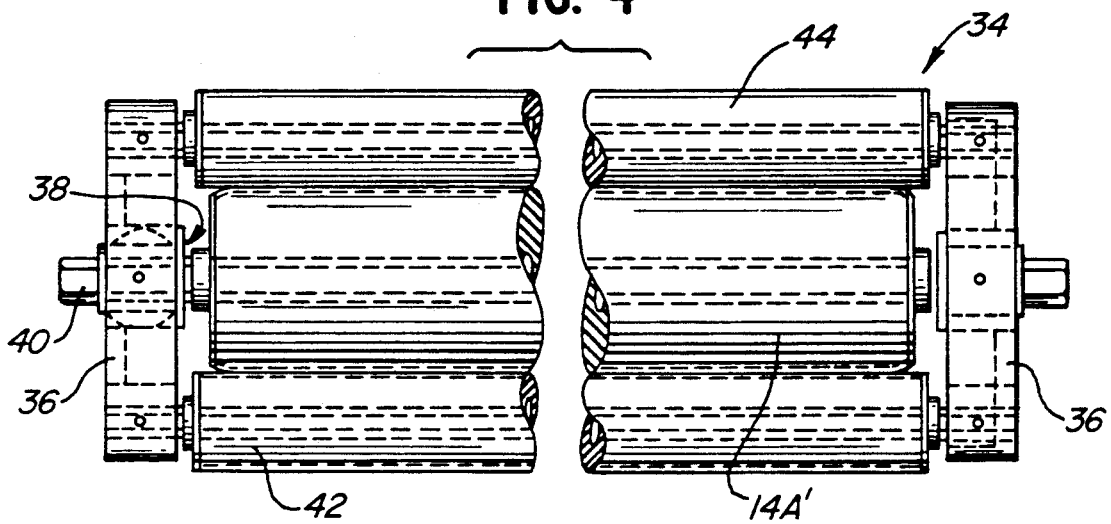
FIG. 4 is a fragmented top plan view of one sensing roller/counterbalance roller assembly of the invention.
Figure 5:
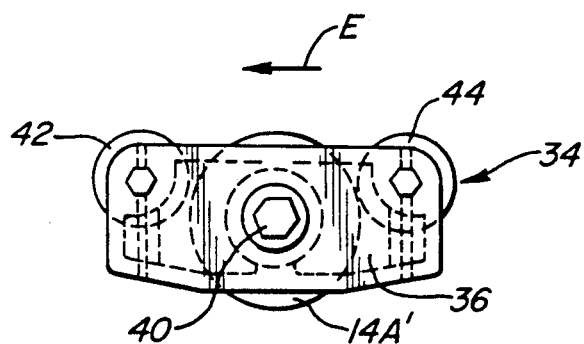
FIG. 5 is an end elevational view looking at the right-hand end of FIG. 4.

Referring to FIGS. 4 and 5 in conjunction with FIG. 3, each sensing roller assembly 34 includes a carriage 36 which is pivotally mounted by bearing assemblies 38 (FIG. 4) on the shaft 40 of the respective load-carrying roller 14A'. Each sensing roller assembly includes a downstream sensing roller 42 and an upstream counterbalance roller 44. It can be seen that sensing roller 42 and counterbalance roller 44 are mounted on opposite sides of shaft (or axis) 40 of load-carrying roller 14A'. It also can be seen that sensing roller 42 is shown elevated above the plane defined by the tops of load-carrying rollers 14,14A', while counterbalance roller 44 is below that imaginary plane. This condition is effected without any mechanical biasing means.

More particularly, in the preferred embodiment of the invention, sensing roller 42 is fabricated of lightweight material, such as aluminum, and counterbalance roller 44 is fabricated of heavier material, such as stainless steel. Therefore, with both rollers mounted in tandem on carriage 36 which is pivotally mounted intermediate its ends to shaft 40 of the respective load-carrying roller 14A', the weight of steel counterbalance roller 44 will, itself, bias aluminum sensing roller 42 upwardly into the path of movement of articles moving along the conveyor. A unique property of such an arrangement is that the sensitivity of sensing roller assembly 34 can be made practically as sensitive as desired to accommodate extremely lightweight articles. The sensitivity simply is determined by the differential weight between the heavier counterbalance roller 44 and the lighter sensing roller 42. Although aluminum and steel are shown for exemplary purposes, the weight differential between the rollers could be a matter of ounces.

Following the detailed discussion of the modes of operation set forth in relation to FIGS. 1 and 2, it can be seen in FIG. 3 that carriage 36 is pivoted downwardly by counterbalance roller 44 into engagement with an actuator button 50. This actuator button may comprise a sensitive limit switch for operating the respective air valve or it could be part of the air valve itself. In any event, the button is operatively associated with an actuator 52 which is, in turn, operatively associated through line 28 with lifting bladders 22 for lifting rollers 16 in the immediately adjacent upstream zone. According to the previously described modes of operation, when an article engages sensing roller 42 of sensing roller assembly 34, carriage 36 will pivot out of engagement with button 50 of actuator 52. A bumper stop 54 may be provided for engaging the underside of the carriage, on an actuator mounting bracket 56, to prevent any undue oscillation of the carriage. When in this position, sensing roller 42 and counterbalance roller 44 are beneath or at least in line with the plane defined by the tops of load-carrying rollers 14,14A'. When sensing roller 42 is depressed, actuator button 50 is released, the air in lifting bladders 22 in the upstream zone is released, lowering the drive belt out of engagement with the load-carrying rollers in that upstream zone, and the operation of the system continuously throughout the conveyor is effected as described previously.

It will be understood that the invention may be embodied in other specific forms without departing from the spirit or central characteristics thereof. The present examples, therefore, are to be considered in all respects as illustrative and not restrictive, and the invention is not to be limited to the details given herein.

I claim:

1. An accumulating conveyor, comprising:
   frame means having generally parallel sides;
   a plurality of load-carrying rollers rotatably mounted between the frame sides;

a plurality of lifting rollers rotatably mounted between the frame sides beneath the load-carrying rollers;

a drive belt extending between the load-carrying rollers and the lifting rollers for rotating the load-carrying rollers in response to the lifting rollers lifting the belt into engagement with the load-carrying rollers;

a plurality of lightweight non-load-carrying sensing rollers disposed between selected pairs of load-carrying rollers, the sensing rollers being mounted on vertically reciprocating carriages and normally being biased to positions above a plane defined by the tops of the load-carrying rollers in the path of movement of articles moving along the conveyor, each said carriage being pivotally mounted on a load-carrying roller for pivoting its respective non-load-carrying sensing roller into the path of movement of the articles along the conveyor; and actuator means operatively associated between the sensing rollers and the lifting rollers in a manner such that a sensing roller is associated with a lifting roller immediately upstream of the respective sensing roller whereby depression of any given sensing roller is effective to lower the immediately upstream lifting roller and thereby stop movement of upstream articles until downstream articles have moved down the conveyor off the given sensing roller.

2. The accumulating conveyor of claim 1 wherein each lightweight non-load-carrying sensing roller is mounted on its respective carriage in tandem with a counterbalance roller heavier than the sensing roller, the counterbalance roller being effective to bias the sensing roller into the path of movement of the articles along the conveyor.

3. The accumulating conveyor of claim 2 wherein each carriage is pivotally mounted with its respective sensing roller and counterbalance roller being mounted on opposite sides of the pivot whereby the counterbalance roller is effective to pivot the sensing roller into the path of movement of the articles along the conveyor.

4. The accumulating conveyor of claim 3 wherein each carriage spans a given load-carrying roller and its respective sensing roller and counterbalance roller are mounted on opposite sides of the given load-carrying roller.

5. The accumulating conveyor of claim 4 wherein the load-carrying rollers are transversely spaced a distance less than their respective diameters less than said distance.

6. The accumulating conveyor of claim 2 wherein the sensing rollers are fabricated of lightweight metal such as aluminum and the sensing rollers are fabricated of heavier metal such as steel 7. The accumulating conveyor of claim 2 wherein said actuator means include an actuator button and said counterbalance roller is effective to bias the carriage into engagement with the actuator button.

8. An accumulating conveyor, comprising:

frame means having generally parallel sides;

a plurality of load-carrying rollers rotatably mounted between the frame sides;

a plurality of lifting rollers rotatably mounted between the frame sides beneath the load-carrying rollers;

a drive belt extending between the load-carrying rollers and the lifting rollers for rotating the load-carrying rollers in response to the lifting rollers lifting the belt into engagement with the load-carrying rollers;

a plurality of sensing roller assemblies spaced along the conveyor, each assembly including a carriage pivotally mounted on an axis of a load-carrying roller and extending radially to opposite sides of the roller, a lightweight non-load-carrying sensing roller mounted on the carriage on one side of the axis, and a counterbalance roller heavier than the sensing roller being mounted on the carriage on the opposite side of the axis, the counterbalance roller being effective to bias the sensing roller into the path of movement of the articles along the conveyor; and actuator means operatively associated between the sensing roller assembly and the lifting rollers in a manner such that a sensing roller is associated with a lifting roller immediately upstream of the respective sensing roller, whereby depression of the sensing roller is effective to lower the immediately upstream lifting roller and thereby stop movement of upstream articles until downstream articles have moved down the conveyor off the respective sensing rollers.

9. The accumulating conveyor of claim 8 wherein the load-carrying rollers are transversely spaced a distance less than their respective diameters, and the sensing rollers have diameters less than said distance.

10. The accumulating conveyor of claim 8 wherein the sensing rollers are fabricated of lightweight metal such as aluminum and the sensing rollers are fabricated of heavier metal such as steel.

11. The accumulating conveyor of claim 8 wherein said actuator means include an actuator button and said counterbalance roller is effective to bias the carriage into engagement with the actuator button.

12. An accumulating conveyor, comprising:

frame means having generally parallel sides;

a plurality of driven load-carrying rollers rotatably mounted between the frame sides;

a plurality of lightweight non-load-carrying sensing rollers disposed between selected pairs of load-carrying rollers, the sensing rollers being mounted on vertically reciprocating carriages and normally being biased to positions above a plane defined by the tops of the load-carrying rollers in the path of movement of articles moving along the conveyor, each sensing roller being mounted on a carriage pivotally mounted on an axis of a load-carrying roller for pivoting the sensing roller into the path of movement of the articles along the conveyor; and actuator means operatively associated between the sensing rollers and selected load-carrying rollers upstream of the respective sensing rollers whereby depression of any given sensing roller is effective to stop the upstream load-carrying rollers and thereby stop movement of upstream articles until downstream articles have moved down the conveyor off the sensing rollers.

13. The accumulating conveyor of claim 12 wherein each lightweight non-load-carrying sensing roller is mounted on its respective carriage in tandem with a counterbalance roller heavier than the sensing roller, the counterbalance roller being effective to bias the sensing roller into the path of movement of the articles along the conveyor.

14. The accumulating conveyor of claim 13 wherein each carriage is pivotally mounted with its respective sensing roller and counterbalance roller being mounted on opposite sides of said axis whereby the counterbalance roller is effective to pivot the sensing roller into the path of movement of the articles along the conveyor.

15. The accumulating conveyor of claim 14 wherein each carriage spans a given load-carrying roller and its respective sensing roller and counterbalance roller are mounted on opposite sides of said axis.

16. The accumulating conveyor of claim 15 wherein the load-carrying rollers are transversely spaced a distance less than their respective diameters less than said distance.

17. The accumulating conveyor of claim 13 wherein the sensing rollers are fabricated of lightweight metal such as aluminum and the sensing rollers are fabricated of heavier metal such as steel.

* * * * *